United States Patent [19]

Mostafa et al.

[11] Patent Number: 4,965,798
[45] Date of Patent: Oct. 23, 1990

[54] APPARATUS FOR FLEXIBLY ALLOCATING BANDWIDTH FOR A POINT-TO-POINT, SERIAL, BIDIRECTIONAL COMMUNICATION PATH

[75] Inventors: Asghar D. Mostafa, Silver Spring; Kirk H. Berry, Gaithersburg, both of Md.

[73] Assignee: Data General Corporation, Westboro, Mass.

[21] Appl. No.: 308,355

[22] Filed: Feb. 9, 1989

[51] Int. Cl.$^5$ .............................................. H04J 3/16
[52] U.S. Cl. .................................. 370/079; 370/095.1
[58] Field of Search ............... 370/84, 95, 110.1, 17, 370/79, 80, 85.7, 95.1

[56] References Cited

U.S. PATENT DOCUMENTS

| | | | |
|---|---|---|---|
| 4,547,877 | 10/1985 | Lehman et al. | 370/84 |
| 4,646,290 | 2/1987 | Hills | 370/84 |
| 4,658,152 | 4/1987 | Walters | 370/84 |
| 4,763,319 | 8/1988 | Rozenblit | 370/84 |
| 4,823,342 | 4/1989 | Morita et al. | 370/79 |
| 4,852,089 | 7/1989 | Berry et al. | 370/95.1 |

Primary Examiner—Douglas W. Olms
Assistant Examiner—Melvin Marcelo
Attorney, Agent, or Firm—Joseph J. Kaliko; Joel Wall

[57] ABSTRACT

Methods and apparatus are set forth which provide for the allocation of bandwidth for point-to-point, serial, bidirectional communication paths in a digital switching system. Bandwidth allocation is performed at both ends of a path (e.g. T1 line, IML, etc.) and may take place in either direction. Furthermore, according to the preferred embodiment of the invention, the Bandwidth Allocation Facility (BAF) at each end of a given path allocates bandwidth in integer multiples of maximum switching system granularity. The BAF also supports the implementation of user requests for any one of a plurality of allocation and boundry rules. To minimize the probability of contention and out of band signalling between the BAF pair associated with a given path, a front-to-back search mechanism is assigned for one BAF of the pair, while the other BAF utilizes a back-to-front search mechanism. In this way contention occurs only when a path's capacity nears exhaustion while uneven loading (one side of the path versus the other) is accommodated. Further yet, methods and apparatus are set forth which support rapid deallocation of bandwidth and status reporting.

29 Claims, 3 Drawing Sheets

◯ = NODE

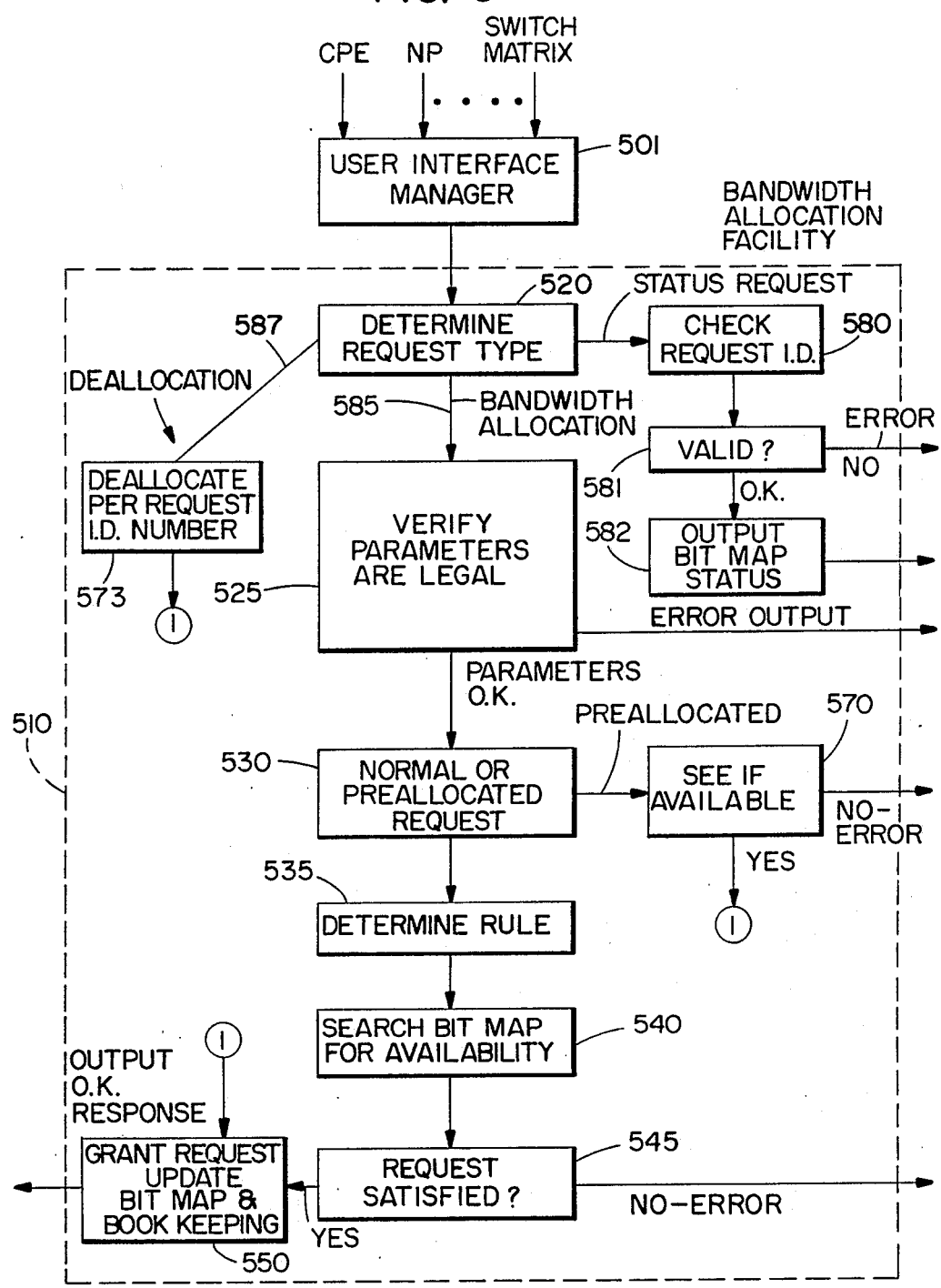

APPARATUS FOR FLEXIBLY ALLOCATING BANDWIDTH FOR A POINT-TO-POINT, SERIAL, BIDIRECTIONAL COMMUNICATION PATH

BACKGROUND OF THE INVENTION

1. Field of the Invention

The invention relates generally to methods and apparatus for flexibly allocating bandwidth on a communication path in a digital communication network. More particularly, the invention relates to methods and apparatus that perform the allocation function for each point-to-point, serial, bidirectional communication path (e.g., a T1 line between nodes, an intermodule link within a node, etc.) in a digital switching system, with minimum call blocking and in accord with user selected allocation rules.

2. Description of the Related Art

Communication networks typically consist of a plurality of communications processing nodes connected via communication links, be they leased telephone lines, local area networks (LANs) or wideband span lines operating at 1.544 Mbps or higher. In addition, it is very common to initially deploy a limited number of nodes serving initially some limited number of mainframes and users, terminals, voice trunks and the like.

As a network application matures, the number of nodes invariably increases, and each node grows to support an ever increasing number of customer premises data processing and communications equipment. It invariably forces the users to obsolete the communications processing nodes, because nodes with sufficient reserve processing power are not purchased initially due to cost.

Lines to be serviced by a node are generally of two kinds: "CPE (customer premises equipment) side" and "network side". The CPE-side lines connect to and service such equipments as local terminals, PC's, LAN's, PBX's, and so forth, while the network-side lines connect the particular node to other nodes in the network. In general, lines coming in on the CPE side may carry data at relatively low data rates, while network-side lines are usually high-speed lines (e.g., T1 lines operating at 1.544 Mpbs). It is customary to allocate data rates to network-side line bandwidths in 64 Kbps "slots", which means that a low data rate transaction makes inefficient use of such a slot. For a transaction requiring more than one slot, the prior art generally imposes the constraint that contiguous slots must be allocated; this sometimes leads to call blocking even though sufficient slots are available, because the available slots are not contiguous.

It is also customary for a node to allocate half of a line's bandwidth to transactions that it (the node) may allocate to that line, while reserving the other half for transactions that the node on the other end of that line may allocate to that line; under this arrangement, when a preponderance of transactions is being initiated from one "side" the allocation may be exceeded and calls will have to be blocked, even though unused capability remains allocated to the "other side".

In copending application Ser. No. 07/103,612, filed Oct. 1, 1987, now U.S. Pat. No. 4,852,089, assigned to the same assignee as this invention and hereby incorporated by reference, an invention is disclosed which uses (a) dual-ported processor(s), with one such port being a standard computer bus, the other port being a traditional telecommunications serial wideband port, and (b) a communications sideband space or time-slot switch. The high speed switch connects one, two or more such processing resources to the local data processing and/or communication elements (data terminals, personal computer, PBX, etc.) as well as to the rest of the user's network. When more features or elements are needed locally, or when the network grows larger and additional processing power is required, additional dual-ported processors are installed.

Furthermore, according to the invention described in the copending application, the 64 Kbps "slots" of the lines are further subdivided into individually allocable 8 Kbps "fragments", thus reducing the inefficiency introduced by allocating a low-rate transaction to 64 Kbps slot.

Each node is provided with a bit map for each line connected to a node for keeping track of fragment allocations. Each bit position corresponds to each fragment and the bit occupying that position takes a value of 0 to indicate that the corresponding fragment is available or a value of 1 to indicate that it is in use. Available fragments can be found regardless of their position in the communications line, thus eliminating the need to allocate contiguous slots or contiguous fragments for a transaction requiring more than one.

From the standpoint of a line interconnecting two nodes, the convention is employed that fragments will be allocated by one node starting from the "beginning" of the bit map, and by the other node starting from the "end" of the bit map; the prior-art drawback of inefficiency resulting from fixed allocations is thus eliminated. (It will be recalled that each node maintains a bit map for each line connected to it.) Each node informs the other of allocations by means of a signalling channel contained in the line so that each may keep its bit map current.

As a further improvement over the invention disclosed in the incorporated copending application, it would be desirable if the bit map, fragment oriented, bandwidth allocation techniques used for lines interconnecting nodes, were also used within each node for allocating bandwidth on Inter Module Links (IMLs). IMLs are typically used to couple user equipment connected to the same node, to couple a switch matrix to a user interface within a given node, to couple a node processor to a switch matrix within a given node, etc.

Further yet, it would be desirable to be able to allocate bandwidth on any point-to-point, serial, bidirectional path in the switching system, e.g. T1 line, IML, etc., in a manner that capitalizes on maximum switch granularity and is flexible enough to allow a variety of allocation rules to be requested and implemented. Such a bandwidth allocation facility would enable user (bandwidth requester) needs to be better matched to both maximum switching system capability and available bandwidth resulting in a minimization of contention and call blocking problems.

SUMMARY OF THE INVENTION

According to the invention, methods and apparatus are set forth which provide for the allocation of bandwidth for point-to-point, serial, bidirectional communication paths in a digital switching system. Bandwidth allocation is performed at both ends of a path (e.g. T1 line, IML, etc.) and may take place in either direction.

Furthermore, according to the preferred embodiment of the invention, the Bandwidth Allocation Facility (BAF) at each end of a given path allocates bandwidth in integer multiples of maximum switching system granularity. The BAF also supports the implementation of user requests for any one of a plurality of allocation and boundary rules.

To minimize the probability of contention and out of band signalling between the BAF pair associated with a given path, a front-to-back search mechanism is assigned for one BAF of the pair, while the other BAF utilizes a back-to-front search mechanism. In this way contention occurs only when a path's capacity nears exhaustion while uneven loading (one side of the path versus the other) is accommodated.

Further yet, methods and apparatus are set forth which support rapid deallocation of bandwidth and status reporting.

The objective of the invention is to provide a BAF that is flexible enough to accommodate implementation of any one of a plurality of allocation rules while performing the allocation function in a manner that takes into account switching system granularity.

A further objective of the invention includes maximizing resource allocation while providing deallocation and status reporting mechanisms.

The invention features performance of the allocation function with a minimum of contention and call blocking, and operates with a minimum of out of band signalling.

These and other objects and features of the present invention will be understood by those of ordinary skill in the art, after referring to the detailed description of the preferred embodiment and the appended drawing.

BRIEF DESCRIPTION OF THE DRAWING

FIG. 5 is a functional block diagram depicting the operation of the invention in flow diagram form.

DETAILED DESCRIPTION

Figure 1:
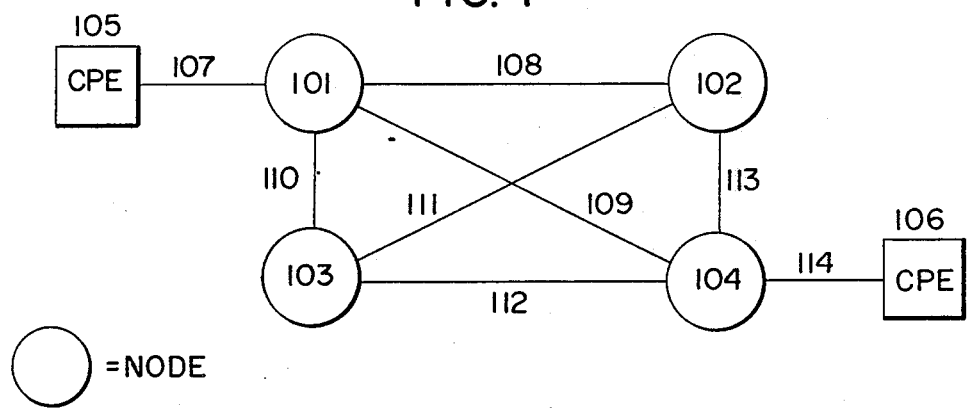
FIG. 1 (prior art) is a high-level functional representation of a typical digital data communication network comprising nodes interconnected by communication lines.

FIG. 1 depicts a typical network consisting of nodes 101, 102, 103, and 104 interconnected by communication lines. Some of the nodes are shown as having CPE equipment connected to them. (Node 101 is shown connected to CPE 105, and node 104 is shown connected to CPE 106.) In practice, any of the nodes may have CPE connected to them.

Figure 2:
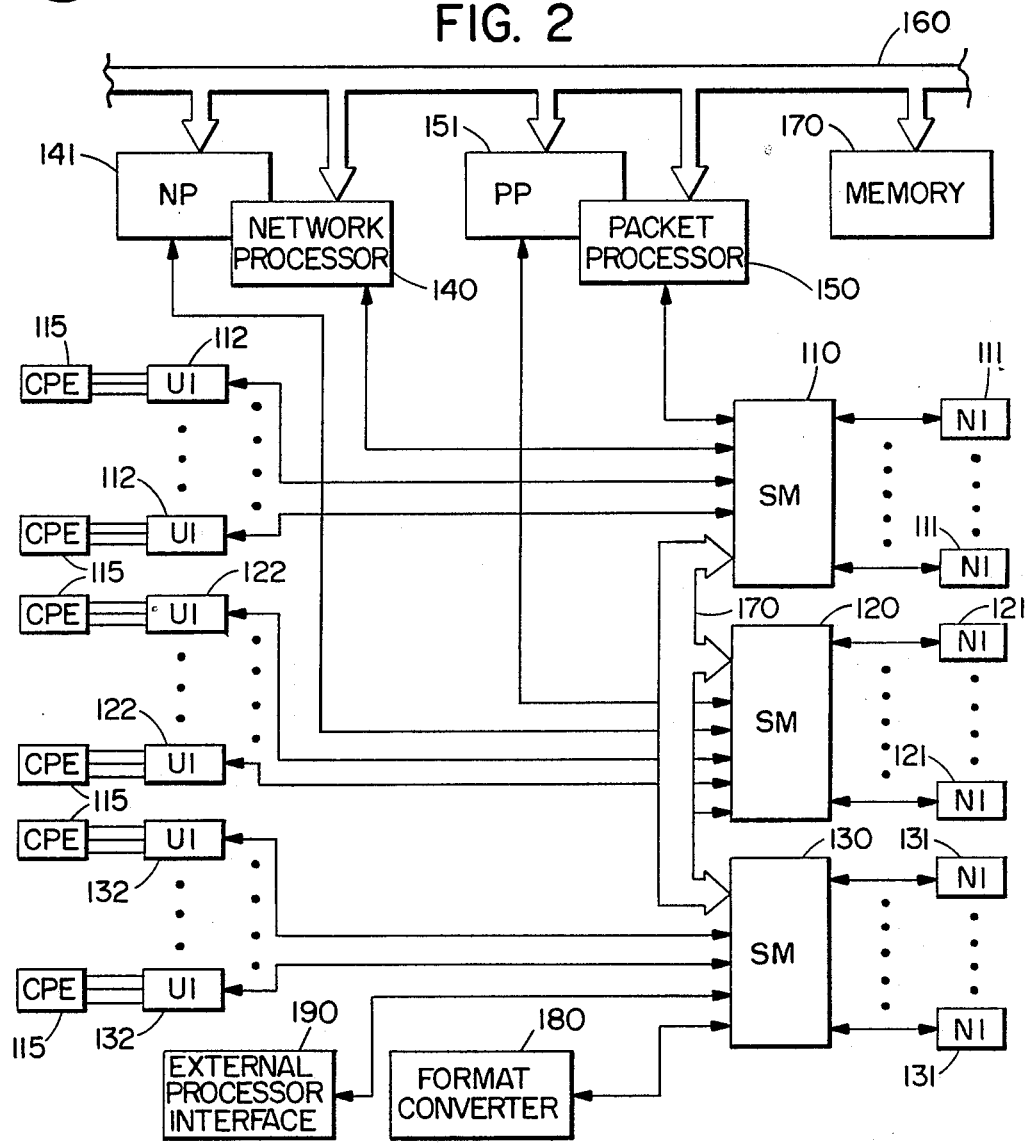
FIG. 2 is a block diagram of one such node showing a variety of communication paths both within and outside of a given node.

FIG. 2 shows internal detail of a typical node, comprising a wideband time-slot switch matrix (110, 120, 130) and a number of dual-ported Network Processors (140, 141) connected to each other via 2.048 Mbps serial links. These internal node paths are each referred to herein as an "IML". The switch matrix permits connectivity between the network processors, as well as connecting them to the network, via network interface (NI) means such as NI 111, and to local terminals, PCs and PBX (labeled as CPE 115) via other similar serial links and devices such as user interface (UI) means 12.

FIG. 2 also shows that each network processor is connected to a typical parallel computer bus 160. The network processors of the system can either be connected together with a single such bus, or in groups to more than one such bus. This way the necessary computing resources, such as memory 170, can be connected to the switch processors in a manner traditional to the computer industry.

The first network processor installed in the system is also programmed to control the switch matrix connections, such that when particular users in the network require access to a given network processor, that connection is carried out by the first network processor upon receiving a command from that specific user.

On the other hand, asynchronous network processor to network processor interconnectivity is achieved over the computer bus, such as is required when two such network processor units are sharing a single communications processing function such as packet switching. For example, a packet received by network processor 140 which was destined to network processor 141, if sharing the same bus, simply hands off such packet to network processor 141 using either DMA or a "mailslot" technique.

If a node that has been installed with N network processors is showing inadequate performance, or must then perform additional functionality, network processor N+1 is added. Furthermore, if the bus bandwidth is inadequate for all the functions being performed in a single-bus system, a second computer bus can be added to the system to separate into separate computing groups the functions that are not interrelated.

Figure 3:
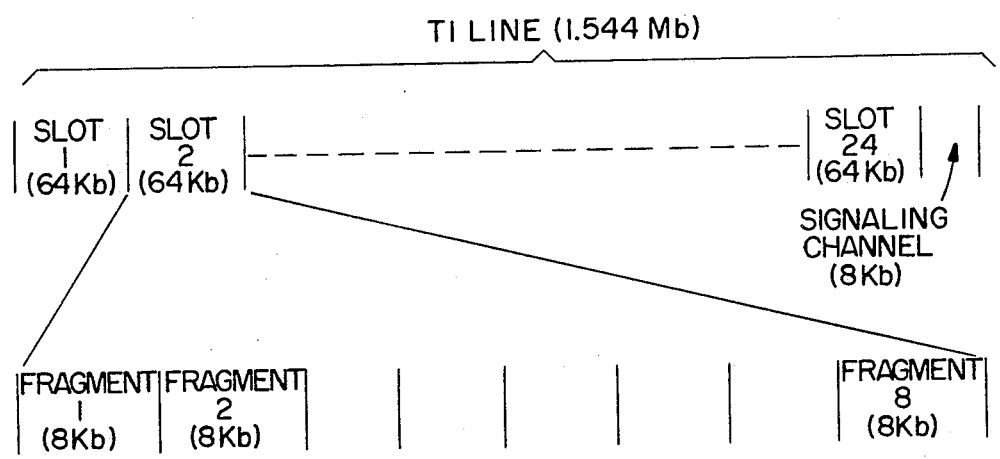
FIG. 3 depicts the allocation of a communication line into "slots" and "fragments".

FIG. 3 depicts the allocation of bandwidth of a 1.544 Mbps T1 communication line in a switching system assumed, for the sake of illustration only, to have an 8 Kbps switching granularity. The available bandwidth is shown divided into twenty-four 64 Kbps slots. (24×64 Kbps=1.536 Mbps; subtracting this from the 1.544 Mbps line bandwidth leaves 8 Kbps available as a signalling channel.) Each 64 Kbps slot is further divided into eight "fragments" of 8 Kbps each.

Not shown but contemplated by the invention, is a bandwidth allocation scheme for other data path frequencies, for example, the higher frequency IMLs. For these 2.048 Mbps paths, thirty-two 64 Kbps slots, each with eight 8 Kbps fragments, can be defined.

According to the invention, the ideal fragment bandwidth is the same as the maximum switching system granularity. Thus, for a switching system having a switching granularity of "x" bps, the ideal fragment width is also x bps. Dividing the fragment width into the frame bandwidth will indicate the number of fragments possible per frame. These can be grouped into slots such that each frame has an integral number of slots, m, where each slot has an integral number of fragments, n.

Returning to the illustrative example, as data begins flowing into a node (for the T1 line example) for forwarding, a portion of the available bandwidth on the line on which that data appears is inherently taken up by the data, the portion being the data rate in bps of the data rounded up to the next highest 8 Kbps fragment. The node must allocate the corresponding amount of bandwidth on the line on which the data is to leave the node (which may or may not be the same line on which it comes in).

To facilitate this allocation and support internal node (IML) allocation as well, bit maps for each line connected to (or within) the node are maintained by the network processor (NP) within a memory, such as memory 170. The bit map for a line contains one bit position corresponding to each fragment of that line. Each bit position will contain a ONE to indicate that the corresponding fragment is in use and unavailable, or a ZERO to indicate that the corresponding fragment is available. The network processor can thus easily identify available fragments simply by searching through the bit map looking for ZERO bits. If more than one fragment is required, there is no necessity to assign contiguous fragments, as available fragments can be located anywhere in the line.

By adopting the convention that fragments will be allocated for transactions originating from a given node from one end of the bit map, and for transactions originating from a node on the other end of a line from the other end of the bit map, there is no need to pre-allocate to either, enabling the system to be more efficient when a preponderance of transactions is originating from one side or the other. The same allocation within a node will enhance performance of the IMLs.

Figure 4:
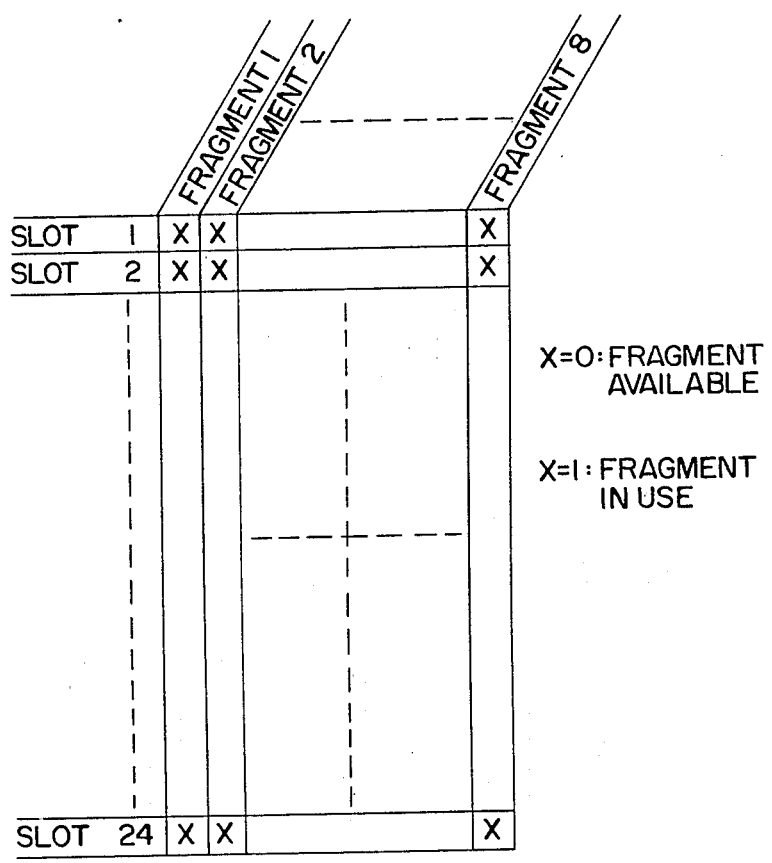
FIG. 4 depicts a bit map employed in the present invention.

An example of a suitable bit map is delineated in FIG. 4. When fragments of a line are being allocated, the BAF on one side of the line informs the BAF at the other end of that line by means of the signalling channel, and the other BAF updates its bit map accordingly. This scheme overcomes the prior-art drawback under the scheme of allocating half the line's bandwidth on each side of the path, of having to block calls when no bandwidth is available in one sides allocation, even though there might in fact be sufficient bandwidth on the line. Should the two sides simultaneously allocate the last available bandwidth, this conflict can be resolved when each side informs the other, as described above, of having made such an allocation.

The architecture and operation of the BAF will now be described in detail with reference to FIGS. 2 and 5.

According to the preferred embodiment of the invention, the BAF resides at an NP like NP 170 as shown in FIG. 2. The BAF is responsible for the processing of requests for allocation, deallocation, and status of bandwidth for every link (both inside and outside of a node) of the system that is under an NP's control.

Requests to the BAF are, according to the preferred embodiment of the invention, made by a user interface manager ("UIM"), shown in FIG. 5 as UIM 501, which can be realized by software that simply makes a bandwidth request based on parameters associated with each of the device and/or line types under the manager's control. The UIM can easily be realized, for example, by software performing a table look up of preselected parameters associated with each line or device type, where the parameters are maintained in a memory. The parameters can be retrieved upon on a specified line or device's request for service. The relevant parameters can then be transmitted by (output from) UIM 501 and input to BAF 510. This is illustrated in FIG. 5 where CPE is shown coupled to UIM 501 and where relevant parameters (to be defined hereinafter) are supplied to BAF 510.

The details of the BAF's structure and operation can be best understood with reference to an example of how to allocate the bandwidth on a 2.048 Mpbs IML. The same concepts can be used to support bandwidth allocation and management on an external link such as a T1 line or any other serial, point-to-point bidirectional path.

In the IML context, each path contains 2.048 megabits of bandwidth. This bandwidth is apportioned into 256 equal size chunks of 8 kilobits each (for an 8 Kbps granularity switching system). The total amount of usable bandwidth may be any $t \times 64$ kilobit portion of IML and is dependent on the type of device that the IML is connected to and the capacity of the communications line interface for the device.

Thus, for example, for an IML path, t may be any integer between 1 and 32. The BAF may be realized by hardware, software and/or a combination of both. According to the preferred embodiment of the invention, BAF 510 is a single software task entity that resides at a NP such as NP 170 shown in FIG. 2. It maintains a control block for every IML (and also each internode path) that is its responsibility. In the 8 Kbps switching system granularity context, each control block specifies the bandwidth map of the IML (or internode path) in terms of 64 Kbps slots and 8 Kbps fragments. The control block also includes the type of device (or line) and the bandwidth allocation rule.

For each request of bandwidth allocation a request service block is maintained by the BAF. These blocks contain all parameters of the request. They may be referenced by a request number which can then be used by the requesting task when deallocating the bandwidth.

Referring again to FIG. 5 (the functional block diagram depicting the operation of a BAF built in accordance with the teachings of the invention), it can be seen that illustrative BAF 510, after receiving a bandwidth request from UIM 501, determines the type of request from a plurality of request possibilities.

According to the preferred embodiment of the invention, there are three types of requests that can be made. The first is for the allocation of bandwidth. The second is for the deallocation of bandwidth. The third is to request bandwidth status.

Path 585 in FIG. 5 is the "allocation" path. Paths 587 and 589 are the deallocation and status paths respectively, and will also be described hereinafter with reference to FIG. 5.

After determining the request type (at block 520 of FIG. 5) as specified by the user (via UIM 501) the preferred BAF 510 verifies that the input parameters are legal. This is performed at block 525 and can be as simple as checking request size versus maximum size allowed for a given service type, etc., all of which can be preselected and stored at system initialization or upon reprogramming.

Should an illegal parameter be detected, an error response can be output from BAF 510. If the parameters are legal, the BAF of the preferred embodiment will accommodate at least two general types of allocation. The first type is called "normal" allocation and implies that BAF 510 completely determines the bandwidth layout in accordance with a user specified predefined rule. The second type is called "pre-allocated" and implies that the bandwidth layout is completely determined by the requestor. The request type is shown to be determined at block 530 of FIG. 5.

To allocate bandwidth the requesting task should provide the following information:

Allocation type (normal or pre-allocated).

IML identifier of where the bandwidth is to be allocated, for example slot 4, fragments 5, 6 and 7.

Size or speed to allocate ($n \times 8$ Kbps).

Allocation rule (as explained hereinafter).

Requestor address (i.e., where to respond with status, error messages, etc.).

Bandwidth Layout (pre-allocated only).

In the case of a normal (versus preallocated) request type, the bandwidth request allocation rule to be followed must be ascertained by BAF 510. This is shown functionally taking place at block 535 in FIG. 5.

The bandwidth allocation rules define layout constraints to BAF 510. There are four distinct allocation rules supported in an illustrative embodiment of the invention. A fewer or greater number of allocation schemes may be supported without departing from the scope or spirit of the invention.

The first rules of the illustrative embodiment is called nonrestrictive. It implies that the allocator can choose any combination of bandwidth fragments within a frame to fulfill the bandwidth request.

The second rule is called slot restrictive. It is applicable to bandwidth speeds of less than or equal to a 64 Kbps per slot. It implies that the allocator must choose the 8 Kbps fragments from the same 64 Kbps slot. The fragments need not be contiguous in the slot.

The third rule is called contiguous. It implies that the allocator must choose contiguous 8 Kbps fragments to make up the request. The fragments may span 64 Kbps slot boundaries.

The fourth rule is called contiguous slot restrictive. It is a combination of constraints two and three. The allocator must choose the 8 Kbps fragments such that they are contiguous and reside within the same 64 Kbps slot.

In accordance with the preferred embodiment of the invention, each path (IML, T1, etc.) should have a default allocation rule specified and maintained in a bandwidth configuration file. If no specific rule is supplied in a bandwidth request the allocator will apply the default rule. If a rule is specified the allocator will enforce it over the default rule.

Continuing with the normal allocation path, once the specified rule is determined, BAF 510 searches its bit map (at block 540 where the bit map is preferably constructed in the format shown in FIG. 4) for available bandwidth. The method specified hereinbefore of locating the "ZEROS" in the bit map, is perfectly suitable for identifying available fragments.

If the request cannot be accommodated, an error message is generated at block 545 of FIG. 5. If the bit map indicates available bandwidth to satisfy the request, the request is granted. This is shown as happening at block 552 of FIG. 5. Next, the bit map is updated and a "bookkeeping" function (to be explained hereinafter) is performed, represented functionally as also taking place at block 550 of FIG. 5.

As for the aforementioned "bookkeeping", each link is represented at a NP by a bandwidth control block. According to the illustrative, embodiment, each control block represents a series of thirty two slot entries (for the IML example). Each slot represents 64 kbits of bandwidth. The following information is contained, according to the illustrative embodiment, in an IML's bandwidth control block:

IML identifier—This, according to the illustrative embodiment, is an 8-bit field that uniquely identifies an IML of the system.

Device type—All IMLs emanate from the switch to a specific device. This device could, for example, be a NP, a T1 line, a PBX, etc.

Number of active slots—Any subset of the IML's 32 slots may be active. Active implies that the slot has allocatable bandwidth.

T1 clear or non-clear—This a specific attribute of the T1 device type. Clear indicates that the entire 64 kbit slot may be used. Non-clear indicates that only 56 kbit is available. Non-clear slots (channels) are enforced when the T1 must adhere to a ones density requirement.

Bandwidth Allocation Rule—This is the default allocation rule for the IML. It, in the preferred embodiment of the invention, is one of the four rules discussed.

Search Orientation—This indicates where to begin allocation searches. This can be either the beginning of the band (numerically smallest active slot number) or the end of the band (numerically largest active slot number). Naturally, searches started at the beginning progress toward the end and vice-versa. The Search Orientation concept is important for realizing the minimization of contention and call blocking objectives of the invention. It is particularly important for devices that interface to network communications links connecting high speed exchanges. Each end of the link will use a different search orientation so that allocation collisions will be minimized.

According to the preferred embodiment of the invention, each slot entry contains the following two fields:

Status—This indicates whether the slot is active or inactive. It may also contain miscellaneous information.

Fragmant Map—This is a bit map of the 8×8 Kbps fragments (for the 8 Kbps granularity switch example). The allocator will mark available fragments (or sub-slots) with a 0 and allocated fragments with a 1. Obviously, the value of the marker bits can be arbitrarily chosen.

When BAF 510 allocates the bandwidth it will return a response to the requestor. The response will contain the following information:

Response status—This indicates whether the request was successful or unsuccessful and if unsuccessful what error occurred.

Request identifier number—This is a unique identifier of the bandwidth request. The requestor can, according to the preferred embodiment of the invention, use this number when deallocating bandwidth.

To de-allocate bandwidth the requestor supplies the requestor number that was assigned during allocation. The allocator will respond with the status.

Before explaining how BAF 510 supports deallocation and status requests, an explanation of how BAF 510 functions for both request types will be set forth.

Recalling that at block 530 of FIG. 5 the request type is determined, if a preallocated request is discovered, the availability of the specific slots and fragments requested by the user are checked by examining the BAF's bit map. If the request cannot be granted, an error message is signalled as shown at block 570 of FIG. 5. If the request can be granted, it is granted and the bookkeeping functions described with reference to block 550 are performed at block 570.

An illustrative way of implementing the deallocation feature of BAF 510 is also shown in FIG. 5. The request identifier number referred to hereinbefore, uniquely identifies a bandwidth request and the location of the ONES in the bit map which need to be reset to ZERO to free up the allocated bandwidth.

Upon receipt of a valid request for deallocation, BAF 510 simply resets the appropriate bit map entries to ZERO thereby completing deallocation. This depicted as functionally being carried out by block 575 in FIG. 5.

FIG. 5 also shows a mechanism for reporting status. Block 580 of FIG. 5 can function as means to check the validity of a requestor's ID, block 581 can be used to report an error (e.g., invalid ID) or enable the status of the bit map to be read by a valid requestor (block 582).

Of course, the allocation, deallocation and status report functions could be performed in many ways by those skilled in the art. The examples and functional block flow diagram in FIG. 5 is but one way to realize the invention.

What has been described is a BAF that meets all of the objectives set forth hereinbefore. Those skilled in the art will recognize that the foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto:

What is claimed is:

1. In a digital data communication system, having a switching granularity of "x" bps, comprising a plurality of point-to-point, serial, bidirectional data paths each having a bandwidth, wherein the bandwidth of at least a first data path is divided into "m" slots, the slots each being subdivided into "n" fragments where the bandwidth of each granularity x, each one of said plurality of data paths being for transporting data within said system in response to a request for bandwidth from at least one of a set of data path users and wherein the system further comprises user interface manager means that stores, identifies and transmits parameters associated with a given user's bandwidth allocation request, and
   bandwidth allocation control means, coupled to a first end of said first data path and to said user interface manager means, for controlling allocation of data bandwidth to one or more of the m×n fragments of first data path bandwidth, comprising:
   (a) bit map means comprising m×n bit locations, each bit location corresponding to a different fragment on said first data path wherein each one of said m×n bit locations is used for storing a binary bit which takes a value of ZERO for indicating that its corresponding fragment is available or a value of ONE for indicating that its corresponding fragment is in use and unavailable;
   (b) allocation means for identifying available fragments on said first data path, in response to a particular data path user's request for bandwidth allocation, as specified by parameters received from said user interface manager means, wherein said allocation means is capable of performing the allocation in accordance with any one of a plurality of predefined rules, each of which define the bandwidth allocation layout request and any constraints.

2. Apparatus as set forth in claim 1 wherein said allocation means further comprises means for identifying available fragments in accordance with the constraints associated with a given one of said predefined rules, by locating a corresponding ZERO in the bit map means, assigning data bandwidth to the available fragment, and marking the fragment as being in use by recording a ONE in the fragments corresponding bit location in said bit map means, thereby allocating bandwidth in fragment packets that are integer multiples of the maximum switching system granularity.

3. Apparatus as set forth in claim 2 wherein said allocation means is capable of performing nonrestrictive bandwidth allocation to thereby permit any combination of m×n fragments to be used to fulfill a particular bandwidth request.

4. Apparatus as set forth in claim 2 wherein said allocation means is capable of performing slot restrictive bandwidth allocation thereby restricting allocation to fulfill a bandwidth request to fragments from one of said m slots.

5. Apparatus as set forth in claim 2 wherein said allocation means is capable of performing contiguous bandwidth allocation thereby restricting allocation to fulfill a bandwidth request to contiguous fragments without being slot restrictive.

6. Apparatus as set forth in claim 2 wherein said allocation means is capable of performing contiguous slot restrictive bandwidth allocation thereby restricting allocation to fulfill a bandwidth request to contiguous fragments within the same one of said m slots.

7. Apparatus as set forth in claim 1 wherein said set of predefined rules includes a default allocation rule in the event no allocation rule is specified by the user.

8. A digital communication system set forth in claim 1 further comprising deallocation means, coupled to said user interface manager means and responsive to transmitted parameters input therefrom, for designing data bandwidth off said first data path and for marking fragments deallocated as available by recording a ZERO in the corresponding bit location in said bit map means.

9. Apparatus as set forth in claim 8 wherein said deallocation means is responsive to a unique request ID number to deallocate a block of previously assigned fragments.

10. A digital communications system as set forth in claim 8 wherein said first data path includes a signalling channel for exchanging procedural information between said bandwidth allocation control means coupled to said first end of said first data path and a second bandwidth allocation control means coupled to the second, opposite end of said first data path, and further wherein each allocation control means is such that:
   (a) the bit map means is linearly organized, having a first end and a second end opposite to the first end; and
   (b) in the allocation means, available fragments are identified by the allocation control means coupled to the first end of said first path, by searching from the first end of the bit map means, and by the allocation control means coupled to the second end of said first path, by searching from the second end of the bit map means.

11. The digital data communication system recited in claim 10 wherein each of the two bandwidth allocation control means, coupled to said first data path, inform the other, via the signalling channel, of fragment allocations made, and each of said two bandwidth allocation control means further include means for updating their respective bit maps according to information received via the signalling channel.

12. Apparatus as set forth in claim 1 further comprising status reporting means, coupled to said user interface manager and responsive to transmitted parameters input therefrom, for determining and reporting the status of allocation requests to said user interface manager means.

13. Apparatus as set forth in claim 2 wherein said allocation means is capable of supporting requests for preallocated bandwidth assignments specified by said user interface manager means.

14. Apparatus as set forth in claim 2 that assigns bandwidth according to a default allocation rule when no predetermined rule is specified by the parameters input from said user interface manager means.

15. A method of allocating bandwidth on each of a plurality of data paths in a digital communication switching system that has a switching granularity of "x" bits per second, wherein each of said data paths has a bandwidth divided into "m" slots, the slots each being subdivided into "n" fragments where n is a function of x, comprising the steps of:
   (a) allocating bandwidth, via bandwidth allocation control means, in integer multiples of x bits per second in accordance with predefined allocation rules;
   (b) maintaining a bit map for each end of a given data path wherein each map has at least m×n bit locations, each of said m×n bits corresponding to a different fragment on the path for which the bit maps are being maintained and further wherein the state of each bit indicates whether a particular fragment is available;
   (c) allocating bandwidth from a given end of said given data path by identifying an available fragment on said line utilizing the bit map being maintained for the given end of the data path; and
   (d) changing the state of the bit associated with the available fragment being allocated to thereby record that the fragment has been placed into use.

16. A method as set forth in claim 15 further comprising the step of deallocating previously allocated bandwidth on a given data path by changing the state of the bit corresponding to the fragment being deallocated.

17. A method as set forth in claim 16 wherein each bit map is linearly organized, having a first end and a second end opposite to said first end, and further wherein the step of allocating bandwidth is performed by first and second bandwidth allocation control means pairs, the first control means of said pair being used to allocate bandwidth from a first end of a given data path and the second control means of said pair being used to allocate bandwidth from a second, opposite end, of said given data path, wherein the first control means allocates bandwidth by identifying an available fragment starting at the first end of the bit map maintained for the first end of said given data path.

18. A method as set forth in claim 17 wherein said step of allocating bandwidth is further performed by said second control means allocating bandwidth by identifying an available fragment starting at the second end of the bit map maintained for the second end of said given data path.

19. Apparatus for allocating bandwidth in a digital switching system having a switching granularity of "x" bits per second, wherein said digital switching system further comprises a plurality of point-to-point, serial, bidirectional data paths each having a bandwidth, wherein the bandwidth of at least a first data path is divided into a plurality of slots each of which is further subdivided into a plurality of fragments, wherein the bandwidth of each of said plurality of fragments is chosen as a function of said switching granularity, each one of said plurality of data paths being for transporting data within said system in response to a request for bandwidth from at least one of a set of data path users, comprising:
   (a) means for inputting a set of bandwidth allocation parameters to bandwidth allocation control means;
   (b) bandwidth allocation control means, coupled to said means for inputting, for allocating bandwidth as function of said switching granularity ("x" bits per second) in accordance with predetermined allocation rules wherein a particular one of said rules may be specified by a given one of said parameters; and
   (c) user interface manager means, included in said digital switching system, for storing, identifying and transmitting parameters associated with a given user's bandwidth allocation request, wherein said bandwidth allocation control means is coupled to a first end of said first data path and to said user interface manager means, for controlling allocation of data bandwidth to one or more of said plurality fragments of first data path bandwidth.

20. Apparatus as set forth in claim 19 wherein said bandwidth allocation control means further comprises:
   (a) bit map means for indicating the availability of each of said of plurality of fragments; and
   (b) allocation means, coupled to said bit map means, for identifying available fragments on said first data path, in response to a particular data path user's request for bandwidth allocation, as specified by parameters received from said user interface manager means, wherein said allocation means is capable of performing the allocation in accordance with any one of a plurality of predefined rules, each of which define the bandwidth allocation layout request and any constraints.

21. Apparatus as set forth in claim 20 wherein said digital switching system further comprises deallocation means, coupled to said user interface manager means and responsive to transmitted parameters input therefrom, for deassigning data bandwidth off said first data path and for updating said bit map means whenever bandwidth is deallocated.

22. Apparatus as set forth in claim 21 wherein said deallocation means is responsive to a unique request ID number to deallocate a block of previously assigned fragments.

23. Apparatus as set forth in claim 21 wherein said first data path of said digital switching system includes a signalling channel for exchanging procedural information between said bandwidth allocation control means coupled to said first end of said first data path and a second bandwidth allocation control means coupled to the second, opposite end of said first data path, and further wherein each allocation control means is such that:
   (a) the bit map means is linearly organized, having a first end and a second end opposite to the first end; and (b) in the allocation means, available fragments are identified by the allocation control means coupled to the first end of said first path, by searching from the first end of the bit map means, and by the allocation control means coupled to the second end of said first path, by searching from the second end of the bit map means.

24. Apparatus as set forth in claim 23 wherein each of the two bandwidth allocation control means, coupled to said first data path of said digital switching system, inform the other, via the signalling channel, of fragment allocations made, and each of said two bandwidth allocation control means further include means for updating their respective bit maps according to information received via the signalling channel.

25. Apparatus as set forth in claim 19 wherein said bandwidth allocation control means is capable of performing nonrestrictive bandwidth allocation.

26. Apparatus as set forth in claim 19 wherein said bandwidth allocation control means is capable of performing slot restrictive bandwidth allocation.

27. Apparatus as set forth in claim 19 wherein said bandwidth allocation control means is capable of performing contiguous bandwidth allocation.

28. Apparatus as set forth in claim 19 wherein said bandwidth allocation control means is capable of performing contiguous slot restrictive bandwidth allocation.

29. Apparatus as set forth in claim 19 wherein said predetermined allocation rules includes a default allocation rule in the event no allocation rule is specified by the user.

* * * * *